United States Patent
Kweon et al.

(10) Patent No.: US 6,569,569 B1
(45) Date of Patent: May 27, 2003

(54) POSITIVE ACTIVE MATERIAL FOR LITHIUM SECONDARY BATTERIES AND METHOD OF PREPARING THE SAME

(75) Inventors: Ho-Jin Kweon, Cheonan-si (KR);
Hyun-Sook Jung, Cheonan-si (KR);
Geun-Bae Kim, Cheonan-si (KR);
Yong-Chul Park, Cheonan-si (KR);
Wan-Seog Oh, Cheonan-si (KR)

(73) Assignee: Samsung SDI Co., Ltd. (KR)

( * ) Notice: Subject to any disclaimer, the term of this patent is extended or adjusted under 35 U.S.C. 154(b) by 136 days.

(21) Appl. No.: 09/595,379

(22) Filed: Jun. 15, 2000

(30) Foreign Application Priority Data

Jun. 17, 1999 (KR) .............................. 99-22764

(51) Int. Cl.$^7$ ................... H01M 4/36; H01M 4/04; H01M 4/48; H01M 4/52
(52) U.S. Cl. ................ 429/231.1; 429/218.1; 429/223; 429/231.3; 429/231.95; 29/623.1
(58) Field of Search ............... 429/218.1, 223, 429/231.1, 231.2, 231.3, 231.5, 231.6, 231.95; 29/623.1

(56) References Cited

U.S. PATENT DOCUMENTS 6,037,095 A * 3/2000 Miyasaka .............. 429/218.1
6,416,902 B1 * 7/2002 Miyasaka .................. 429/223

* cited by examiner

*Primary Examiner*—Carol Chaney
*Assistant Examiner*—Tracy Dove
(74) *Attorney, Agent, or Firm*—Blakely Sokoloff Taylor & Zafman

(57) ABSTRACT

Disclosed is a positive active material for a lithium secondary battery having high capacity and long durability properties, and particularly to a powder of $LiaNi_{1-x-y}Co_xM_yO_{2-z}F_z$ and $LiaNi_{1-x-y}Co_xM_yO_{2-z}S_z$ (where M is a metal selected from the group consisting of Al, Mg, Sr, La, Ce, V, and Ti, and wherein $0 \leq x < 0.99$, $0.01 \leq y \leq 0.1$, $0.01 \leq z \leq 0.1$, and $1.00 \leq a \leq 1.1$) an oxygen in $LiaNi_{1-x-y}Co_xM_yO_2$ is substituted with F or S whereby the durability, capacity and structural safety of the positive active material is increased.

8 Claims, 2 Drawing Sheets

POSITIVE ACTIVE MATERIAL FOR LITHIUM SECONDARY BATTERIES AND METHOD OF PREPARING THE SAME

CROSS REFERENCE TO RELATED APPLICATION

This application is based on application No. 99-22764, filed in the Korean Industrial Property Office on Jun. 17, 1999, the content of which is incorporated hereinto by reference.

BACKGROUND OF THE INVENTION (a) Field of the Invention

The present invention relates to an active material for a lithium secondary battery and a method of preparing the same, more particularly, to an active material for a lithium secondary battery in which an oxygen (O) in a $Li_aNi_{1-x-y}Co_xM_yO_2$ is substituted with F or S, and a method of preparing the same.

(b) Description of the Related Art

Due to technological advances in appliance miniaturization and weight reduction, and increased functionality of cordless portable appliances such as video cameras, personal phones, and personal computers, there are escalating requirements for the sources of electric power used to driving these appliances. Particularly, there have been advances in developing and studying rechargeable lithium secondary batteries around the world, anticipating the need for a battery with a high energy density.

A lithium secondary battery uses as an anode and a cathode materials which can intercalate and deintercalate lithium ions, and is prepared by filling organic or polymer electrolyte between the cathode and the anode to move the lithium ions. The battery generates electric energy by a redox reaction when lithium ions intercalate and deintercalate in the cathode and in the anode.

Lithium secondary batteries use carbon materials or lithium metals as anodes and intercalatable/deintercalatable chalcogenide compounds as cathodes. Carbon materials are substituted for lithium metals because the latter, when used as an anode, has the disadvantage of educing dendrites with the associated danger of explosion and a reduction in recharging efficiency.

On the other hand, complex metal oxides such as $LiCoO_2$, $LiMn_2O_4$, $LiNi_{1-x}Co_xO_2$ (0<X<1), and $LiMnO_2$ are now being studied for a cathode use because chrome oxide, $MnO_2$, etc. that were initially used have problems with low recharge efficiency and safety.

Manganic positive active materials such as $LiMn_2O_4$, $LiMnO_2$, etc, or cobaltic positive active materials such as $LiCoO_2$, etc, had been developed, but they have the limits of capacity of 120 mAh/g and 160 mAh/g respectively when recharged at 4.3 V. Also, $LiCoO_2$ has been widely used due to having the high voltage capacity, excellent electrode properties, and an electro-conductivity of $10^{-2}$ to 1 S/cm at ambient temperature, but it has low stability when recharged and discharged at a high current rate.

There have been developments in the study of nickelic positive active materials that show a discharge capacity more than 20% greater than cobaltic positive active materials.

Lithium secondary batteries using nickelic positive active materials have the potential to make high capacity batteries due to their high discharge capacity, but more development of nickelic active materials is needed in order to overcome defects associated with their low durability and the structural instability of $LiNi_{1-x}Co_xO_2$ (0<x<1).

Synthesizing methods employing solid state processes, co-precipitation methods, polymer chelating agents, etc, have been developed and researched thus far on $LiNi_{1-x}M_xO_2$ (0<x<1) powder with some Ni substituted with Co, Mn, etc, for improving structural safety features, discharge capacities, and life span properties of the basic nickel based cathode compound, $LiNiO_2$.

$LiNiO_2$ has disadvantages in that it is difficult to synthesize, is not practical to use in a battery because of poor durability, and its capacity decreases suddenly during continuous discharge-recharge cycles due to instabilities caused by its repeated structural change from monoclinic to hexagonal and back, in spite of having a discharge capacity of 200 mAh/g at 1.0 C.

To solve these problems, Co is added to $LiNiO_2$ in order to stabilize the structure, but this causes the problem that the capacity of $LiNiO_2$ decreases relative to the amount of Co added, and this quantity must be more than 30 mole %.

To improve the structural stability, $LiNi_{1-x}M_xO_2$ (M is a metal such as Co or Mn, etc, 0<x<1) and $LiNi_{1-x}Co_xM_yO_2$ (M is a metal such as Al, Mg, Sr, La, Ce, etc, 0<x<1, 0.01<y<0.1) were developed. However, these nikelic positive active materials also have defects of structural instabilities, and this defect causes the stability of the system of lithium secondary battery to decrease.

SUMMARY OF THE INVENTION

It is an object of the present invention to provide a positive active material for a Li secondary battery, wherein $Li_aNi_{1-x-y}Co_xM_yO_{2-z}F_z$ and $Li_aNi_{1-x-y}Co_xM_yO_{2-z}S_z$ (where M is a metal selected from the group consisting of Al, Mg, Sr, La, Ce, V, and Ti, and wherein $0 \leq x < 0.99$, $0.01 \leq y \leq 0.1$, $0.01 \leq z \leq 0.1$, and $1.00 \leq a \leq 1.1$) powders in which an oxygen (O) in $Li_aNi_{1-x-y}Co_xM_yO_2$ is substituted with F or S are synthesized to improve the durability, capacity, and structural stability of the battery.

It is another object to provide a method of preparation of the positive active material for a Li secondary battery.

In order to achieve these other objects, the present invention provides positive active materials for Li secondary battery in which an oxygen (O) in $Li_aNi_{1-x-y}Co_xM_yO_2$ (where M is a metal selected from the group consisting of Al, Mg, Sr, La, Ce, V, and Ti, and wherein $0 \leq x < 0.99$, $0.01 \leq y \leq 0.1$, $0.01 \leq z \leq 0.1$, and $1.00 \leq a \leq 1.1$) is substituted with F or S, that is, positive active materials selected from the group consisting of the following formulae 1 and 2:

 [Formula 1],

 [Formula 2], and where M is a metal selected from the group consisting of Al, Mg, Sr, La, Ce, V, and Ti, and wherein $0 \leq x < 0.99$, $0.01 \leq y \leq 0.1$, $0.01 \leq z \leq 0.1$, and $1.00 \leq a \leq 1.1$.

Also, the present invention further provides a method of preparation the positive active material selected from the group consisting of the formulae 1 and 2.

The method comprises a step of synthesizing $Ni_{1-x-y}Co_xM_y(OH)_2$ by a coprecipitation method; a step of mixing the material with LiOH, and LiF or NaS powder; and a step of producing the positive active compound of the formulae 1 and 2 by heating and cooling the mixture.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
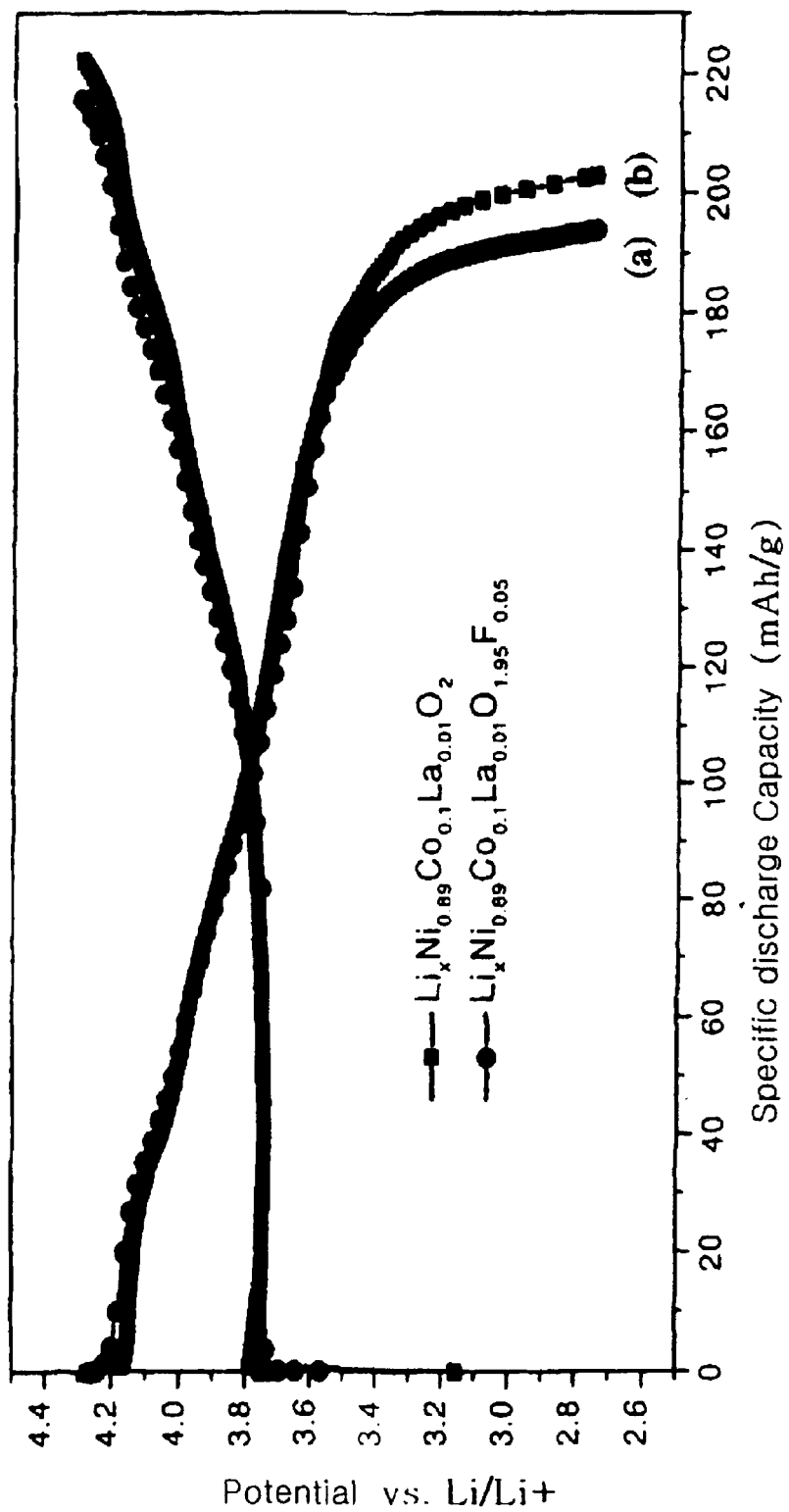
FIG. 1 is a graph showing the result of recharge properties after 1 cycle of coin cells made of a) $Li_{1.02}Ni_{0.89}Co_{0.1}La_{0.01}O_{1.95}F_{0.05}$ and b) $Li_{1.02}Ni_{0.89}Co_{0.1}La_{0.01}O_2$.

A preferred embodiment of this invention will be explained with reference to the accompanying drawings.

The present invention relates to a compound selected from the group consisting of compounds of the following formulae 1 and 2:

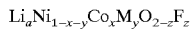 [Formula 1],

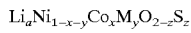 [Formula 2], and where M is a metal selected from the group consisting of Al, Mg, Sr, La, Ce, V, and Ti, and wherein $0 \leq x < 0.99$, $0.01 \leq y \leq 0.1$, $0.01 \leq z \leq 0.1$, and $1.00 \leq a \leq 1.1$.

It is preferable that spherical or quasi-spherical $Ni_{1-x-y}Co_xM_y(OH)_2$ powder coprecipitating metals selected from the group consisting of Al, Mg, Sr, La, Ce, V, and Ti should be used for preparing the compound of the formulae 1 or 2.

$Ni_{1-x-y}Co_xM_y(OH)_2$ is synthesized by a coprecipitation method. A solution is prepared comprising metal salts selected from the group consisting of Al-salt, Mg-salt, Sr-salt, La-salt, Ce-salt, V-salt, Ti-salt, Ni-salt and Co-salt to prepare the $Ni_{1-x-y}Co_xM_y(OH)_2$. At this point, preferably, the concentration of the metal salt is approximately 2.5 M, and water is used as a solvent.

$NH_4OH$ as a binder and NaOH as a precipitant are continuously supplied to the prepared metal solution in an overflowable reactor.

At this time, a reactor temperature is preferably maintained at about 50° C., and the pH in the reactor is preferably maintained between 11 and 12. It is also preferable that the mole ratio of supplied metal to $NH_4OH$ ranges from 1:0.4 to 1:1, and that these materials in the reactor are reacted while being agitated at 900 rpm.

A spherical or quasi-spherical $Ni_{1-x-y}Co_xM_y(OH)_2$ powder is obtained by drying the powder after rinsing the overflowed-reacted reaction precipitant with water or a diluted acid solution until it is neutralized.

A homogeneous mixture is produced by agitating the prepared $Ni_{1-x-y}Co_xM_y(OH)_2$ powder with LiF or NaS powder in an equivalent ratio in a mortar agitator for 10 to 30 minutes.

The powder mixture is then heat-treated at between 600 and 1000° C. for 10 to 30 hours, with dry air being blown in a gas atmosphere controlled furnace to synthesize the positive active powders of the above formulae 1 to 2.

The heat-treatment step is performed by elevating the temperature at a rate of 1 to 5° C./min, and then allowing the powder to naturally cool down after maintaining it at the heat-treatment temperature for a fixed period of time.

It is preferable that lithium salt is homogeneously distributed by remixing the powder of the compound of the formulae 1 and 2 at a room temperature.

The present invention is explained in more detail with reference to the following examples.

EXAMPLE 1

First, $Ni_{0.89}Co_{0.1}La_{0.01}(OH)_2$ was synthesized by a coprecipitation method to prepare $Li_{1.02}Ni_{0.89}Co_{0.1}La_{0.01}O_{1.95}F_{0.05}$.

To prepare $Ni_{0.89}Co_{0.1}La_{0.01}(OH)_2$, the solution comprising metal salt consisting of La-salt, Ni-salt, and Co-salt was prepared. At this time, the concentration of total metal was about 2.5 M and water was used as a solvent.

$NH_4OH$ as a binder and NaOH as a precipitant were continuously supplied to the prepared metal solution in an overflowable reactor.

The temperature of the reactor was maintained at about 50° C. and the pH of the solution in the reactor was maintained between 11 and 12. The mole ratio of $NH_4OH$ and supplied metal ranged between 1:0.4 and 1:1, and the materials in the reactor were reacted while being agitated at 900 rpm.

A spherical or quasi-spherical $Ni_{0.89}Co_{0.1}La_{0.01}(OH)_2$ powder to be later dried was obtained after rinsing the overflowed-reacted reaction precipitant with water or a diluted acid solution until it was neutralized.

A homogeneous mixture was produced by agitating it in a mortar agitator for about 10 to 30 minutes after measuring out LiOH and LiF powder in an equivalent ratio.

$Li_{1.02}Ni_{0.89}Co_{0.1}La_{0.01}O_{1.95}F_{0.05}$ was prepared by heat-treating mixed powder at 700 degree. C. for 20 hours, with dry air circulating in a gas atmosphere controlled furnace.

EXAMPLE 2

Using the method for the preparation of the positive active material according to the example 1, $Li_{1.02}Ni_{0.88}Co_{0.1}La_{0.02}O_{1.95}F_{0.05}$ was produced by the same method and conditions of the example 1, except for the change of mole ratio of La of positive active material in the example 1 from 0.01 to 0.02.

EXAMPLE 3

Using the method for the preparation of the positive active material according to the example 1, $Li_{1.02}Ni_{0.89}Co_{0.1}Mg_{0.01}O_{1.95}F_{0.05}$ was produced by the same method and conditions of the example 1, except for the use of $Ni_{0.89}Co_{0.1}Mg_{0.01}(OH)_2$.

EXAMPLE 4

Using the method for the preparation of the positive active material according to the example 3, $Li_{1.02}Ni_{0.88}Co_{0.1}Mg_{0.02}O_{1.95}F_{0.05}$ was produced by the same method and conditions of the example 3, except for the change of mole ratio of Mg of positive active material in the example 3 from 0.01 to 0.02.

Comparative Example 1

To compare material prepared in the example 1, the positive active material of $Li_{1.02}Ni_{0.89}Co_{0.1}La_{0.01}O_2$ was produced by the same method and conditions of the example 1, except for mixing $Ni_{0.89}Co_{0.1}La_{0.01}(OH)_2$ with powder of only LiOH, not using the powder of LiF.

Comparative Example 2

$Li_{1.02}Ni_{0.88}Co_{0.1}La_{0.02}O_2$ was produced by the same method and conditions of the preparation of the comparative example 1, except for the change of the mole ratio of La from 0.01 to 0.02.

Comparative Example 3

To compare material prepared in the example 3, the positive active material of $Li_{1.02}Ni_{0.89}Co_{0.1}Mg_{0.01}O_2$ was produced by the same method and conditions of the example 3, except for mixing $Ni_{0.89}Co_{0.1}Mg_{0.01}(OH)_2$ with powder of only LiOH, not using the powder of LiF.

Comparative Example 4

$Li_{1.02}Ni_{0.88}Co_{0.1}Mg_{0.02}O_2$ was produced by the same method and conditions of the preparation of the comparative example 3, except for the change of the mole ratio of Mg from 0.01 to 0.02.

The prepared powders according to the methods of the example 1, 2, 3, and 4 and the comparative example 1, 2, 3, and 4 were structurally analyzed by X-ray diffraction (XRD), the powder particles were observed with a Scanning Electron Microscope (SEM) and the properties of the powders were confirmed by SIMS and TEM.

DISCHARGE PROPERTY EVALUATION

The discharge properties of coin type half-cell of the positive active material prepared by the method of the example 1, 2, 3, 4 and the comparative example 1, 2, 3, and 4 were evaluated.

For the preparation of the half-cells, 3-weight percent carbon (product name: Super P) was used as a conductor and 3-weight percent polyvinyllidenefluoride (product name: KF-1300) was used as a binder.

The coin type half-cell was consisted of a pole plate prepared by tape-casting positive active material, conductor, binder on an Al-foil with N-methylpyrrolidine (NMP) solvent, and lithium metal as an opposite pole plate.

The capacity and durability properties of the active material prepared according to the present invention were tested.

For a test of the discharge properties, the half-cells were tested under the condition of discharging a constant 0.1 C., 0.2 C., 0.5 C., and 1 C. between 2.75 V and 4.3 V for one to 100 times.

Figure 2:
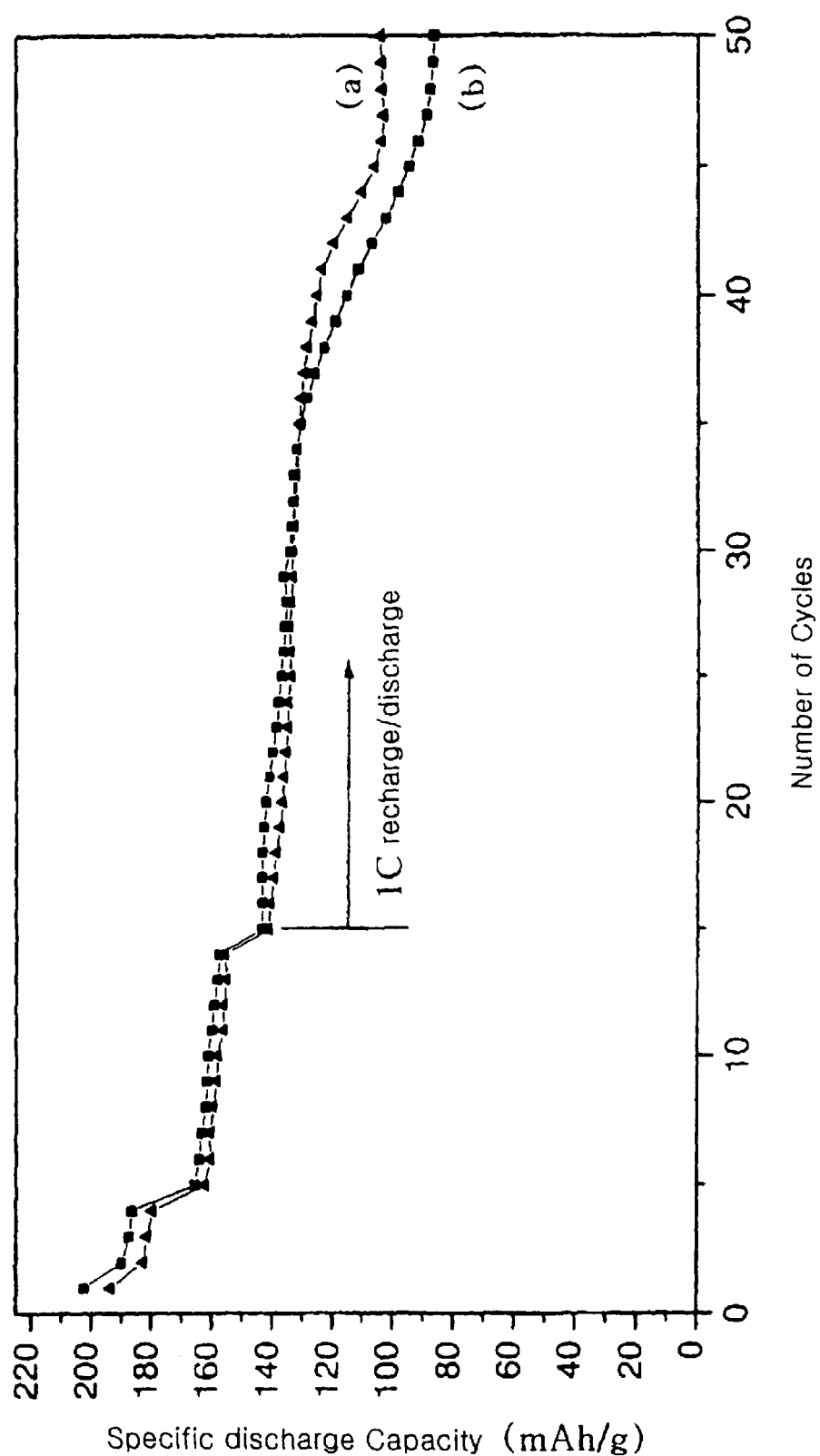
FIG. 2 is a graph showing the result of recharge properties after 50 cycles of coin cells made of a) $Li_{1.02}Ni_{0.89}Co_{0.1}La_{0.01}O_{1.95}F_{0.05}$ and b) $Li_{1.02}Ni_{0.89}Co_{0.1}La_{0.01}O_2$.

The FIGS. 1 and 2 show the results of the discharge property tests.

FIG. 1 shows the result of a property test of discharge for 1 cycle of a) $Li_{1.02}Ni_{0.89}Co_{0.1}La_{0.01}O_{1.95}F_{0.05}$ and b) $Li_{1.02}Ni_{0.89}Co_{0.1}La_{0.01}O_2$, and FIG. 2 shows the result of a property test of discharge for 50 cycles of (a) and (b) of FIG. 1.

As shown in the FIG. 1, capacity of $Li_aNi_{1-x-y}Co_xM_yO_{2-z}F_z$ in which an oxygen (O) in $Li_aNi_{1-x-y}Co_xM_yO_2$ is substituted with F decreases as much as 1 to 3% when the first discharge capacity is evaluated by using coin half-cells. However, when discharge-recharged for 50 cycles as shown in the FIG. 2, the durability property of $Li_aNi_{1-x-y}Co_xM_yO_2$ is about 60%, on the other hand, that of $Li_aNi_{1-x-y}Co_xM_yO_{2-z}F_z$ is 74% under the condition of high current rate of 1 C. Accordingly, the durability property of $Li_aNi_{1-x-y}Co_xM_yO_{2-z}F_z$ increases as much as 14%.

Accordingly, the first discharge property of $Li_aNi_{1-x-y}Co_xM_yO_{2-z}F_z$ in which an oxygen (O) in $Li_aNi_{1-x-y}Co_xM_yO_2$ is substituted with F is slightly lower than that of $Li_aNi_{1-x-y}Co_xM_yO_2$, but the durability property of $Li_aNi_{1-x-y}Co_xM_yO_{2-z}F_z$ increases by 14% in the evaluation of a long-period such as 50 cycles. Therefore, because $Li_aNi_{1-x-y}Co_xM_yO_{2-z}F_z$ is more durable and has higher capacity than $Li_aNi_{1-x-y}Co_xM_yO_2$, $Li_aNi_{1-x-y}Co_xM_yO_{2-z}F_z$ is able to be used for Li-secondary batteries.

What is claimed is:

1. A positive active material for a lithium secondary battery the positive active material having the formula:

$$Li_aNi_{1-x-y}Co_xM_yO_{2-z}F_z$$

wherein M is Ce and $0 \leq x < 0.99$, $0.01 \leq y \leq 0.1$, $0.01 \leq z \leq 0.1$, and $1.00 \leq a \leq 1.1$.

2. A method of preparing the positive active material for a lithium secondary battery comprising:

(a) mixing $Ni_{1-x-y}Co_xM_y(OH)_2$, LiOH, and LiF in an equivalent ratio for 10 to 30 minutes in a mortar agitator; and (b) heat-treating the mixture to produce $Li_aNi_{1-x-y}Co_xM_yO_{2-z}F_z$, with dry air circulating in a gas atmosphere controlled furnace, wherein M is Ce and $0 \leq x < 0.99$, $0.01 \leq y \leq 0.1$, $0.01 \leq z \leq 0.1$, and $1.00 \leq a \leq 1.1$.

3. A method according to claim 2 wherein the $Ni_{1-x-y}Co_xM_y(OH)_2$ (M is Ce and $0 \leq x < 0.99$ and $0.01 \leq y \leq 0.1$) is prepared by mixing with water a metal solution comprising a Ni-salt, a Co-salt, and a M-salt as starting materials.

4. A method according to claim 2 wherein the heat-treatment temperature is 600 to 1000° C., and the heat-treatment time is 10 to 30 hours.

5. A positive active material for a lithium secondary battery, the positive active material having the formula:

$$Li_aNi_{1-x-y}Co_xM_yO_{2-z}S_z$$

wherein M is a metal selected from the group consisting of Al, Mg, Sr, La, Ce, V, and Ti, and $0 \leq x < 0.99$, $0.01 \leq y \leq 0.1$, $0.01 \leq z \leq 0.1$, and $1.00 \leq a \leq 1.1$.

6. A method of preparing a positive active material for a lithium secondary battery comprising:

(a) mixing $Ni_{1-x-y}Co_xM_y(OH)_2$, LiOH, and NaS in an equivalent ratio for 10 to 30 minutes in a mortar agitator; and (b) heat-treating the mixture to produce $Li_aNi_{1-x-y}Co_xM_yO_{2-z}S_z$, with dry air circulating in a gas atmosphere controlled furnace, wherein M is a metal selected from the group consisting of Al, Mg, Sr, La, Ce, V, and Ti, and $0 \leq x < 0.99$, $0.01 \leq y \leq 0.1$, $0.01 \leq z \leq 0.1$, and $1.00 \leq a \leq 1.1$.

7. A method according to claim 6 wherein the $Ni_{1-x-y}Co_xM_y(OH)_2$ (M is a metal selected from the group consisting of Al, Mg, Sr, La, Ce, V, and Ti, and $0 \leq x < 0.99$ and $0.01 \leq y \leq 0.1$) is prepared by mixing with water a metal solution comprising a Ni-salt, a Co-salt, and a M-salt as starting materials.

8. A method according to claim 6 wherein a heat-treatment temperature is 600 to 1000° C., and a heat-treatment time is 10 to 30 hours.

* * * * *

UNITED STATES PATENT AND TRADEMARK OFFICE
CERTIFICATE OF CORRECTION

PATENT NO.    : 6,569,569 B1
DATED         : May 27, 2003
INVENTOR(S)   : Kweon et al.

It is certified that error appears in the above-identified patent and that said Letters Patent is hereby corrected as shown below:

<u>Column 6,</u>
Line 48, please delete "$CO_z$" and insert -- $CO_x$ --.

Signed and Sealed this

Twenty-third Day of November, 2004

JON W. DUDAS
*Director of the United States Patent and Trademark Office*